(12) United States Patent
Nielsen

(10) Patent No.: US 7,123,948 B2
(45) Date of Patent: Oct. 17, 2006

(54) MICROPHONE AIDED VIBRATOR TUNING

(75) Inventor: Claus Peter Nielsen, Copenhagen (DK)

(73) Assignee: Nokia Corporation, Espoo (FI)

( * ) Notice: Subject to any disclaimer, the term of this patent is extended or adjusted under 35 U.S.C. 154(b) by 430 days.

(21) Appl. No.: 10/195,466

(22) Filed: Jul. 16, 2002

(65) Prior Publication Data

US 2004/0204147 A1  Oct. 14, 2004

(51) Int. Cl.
*H04B 1/38* (2006.01)

(52) U.S. Cl. ............... 455/567; 455/550.1; 455/575.1; 340/7.6; 340/7.63; 381/95; 379/419; 379/428.01

(58) Field of Classification Search ........... 455/567, 455/550.1, 575.1, 128, 67.13; 340/407.1, 340/7.58, 7.6, 7.63; 379/418, 428.01, 419; 381/95

See application file for complete search history.

(56) References Cited

U.S. PATENT DOCUMENTS

| | | | |
|---|---|---|---|
| 5,293,161 A | 3/1994 | MacDonald et al. | |
| 5,436,622 A * | 7/1995 | Gutman et al. | 340/7.6 |
| 6,160,489 A * | 12/2000 | Perry et al. | 340/7.6 |
| 6,181,023 B1 * | 1/2001 | Inoue | 307/10.1 |
| 6,226,536 B1 * | 5/2001 | Miyashita | 455/567 |
| 6,259,935 B1 * | 7/2001 | Saiki et al. | 455/567 |
| 6,934,515 B1 * | 8/2005 | Wallach | 455/67.13 |
| 2001/0044722 A1 * | 11/2001 | Gustafsson et al. | 704/258 |
| 2002/0119807 A1 * | 8/2002 | Lee et al. | 455/567 |
| 2002/0183947 A1 * | 12/2002 | Ando et al. | 702/75 |
| 2002/0189430 A1 * | 12/2002 | Mukojima | 84/615 |

FOREIGN PATENT DOCUMENTS

JP  9-247787  *  3/1996

* cited by examiner

*Primary Examiner*—Danh Cong Le
(74) *Attorney, Agent, or Firm*—Banner & Witcoff, Ltd.

(57) ABSTRACT

A method of tuning an alert device in a portable communication apparatus having a microphone. The method involves the steps of recording, through the microphone, an acoustic signal which is emitted by the alert device in response to a drive signal; deriving a characteristic value of the recorded signal; comparing the characteristic value with a reference value and generating a comparison result; and controlling the drive signal of the alert device in response to the comparison result.

18 Claims, 4 Drawing Sheets

MICROPHONE AIDED VIBRATOR TUNING

BACKGROUND OF THE INVENTION

1. Technical Field of Invention

This invention relates to a method of tuning an alert device in a portable communication apparatus. The invention also relates to a portable communication apparatus having a microphone, an alert device and a controller.

2. Background Art

Portable communication apparatuses, such as mobile telephones, are used in different environments and places having different types of conditions as regards, for example, loudness. If a mobile telephone is used in a very noisy environment the volume of the ring signal must be held at a high level. Still it can be difficult to hear the ring signal, and this problem can be solved with a vibrator, which is frequently used in mobile telephones.

The vibrator is initially set to vibrate at a certain desired frequency, and a driver, which drives the vibrator, is designed accordingly. Due to variations in efficiency of the motor of the vibrators and/or the response and the impedance in the output terminal of the drivers, the actual frequency of the vibrator is seldom the same as the desired frequency. The variations can be +/−50% and more. There is also a drift in the actual frequency due to ageing effects.

If the actual frequency gets too low, the signal gets too weak to be easily noticed by the user of the communication apparatus. When this occurs depends on the design of the communication apparatus and where in the apparatus the vibrator is located. Weight and mounting of the vibrators are the most decisive factors. If the actual frequency gets to high, friction in the vibrator becomes a problem and the vibrator produces too much heat, which has a bad effect on the power consumption of the apparatus, and the wearing and therefore aging of the vibrator also increase. A too high frequency also draws an unnecessary amount of power. Usually, one desired frequency is set, which should not be surpassed.

It is known to measure vibrating frequencies of vibrators by using vibration sensors, such as piezo crystals, rotation sensors and optical sensors. After the measurement of its vibrating frequency, the vibrator can be tuned to a desired frequency. A disadvantage with this solution is that it requires extra components. This means that the cost increases. If the measuring components are integrated with the apparatus having the vibrator, the extra components require extra space which is expensive.

Still another possible solution is to use a laser microphone to measure the vibrating frequency. A disadvantage by using such a laser microphone is that it is very expensive.

U.S. Pat. No. 5,293,161 to Motorola describes how the vibration frequency can be monitored and kept constant. The frequency of the vibrator can be varied by varying a frequency selector. The frequency selector comprises a micro computer programmed via conventional techniques to measure a parameter, such as the amplitude of the actual vibration, of the vibrator. Optionally, the micro computer may monitor a signal such as the current or the voltage of the power supply of the vibrator, or the electromagnetic force of the vibrator. This information is then used to keep the frequency of the vibrator essentially constant or at the desired frequency settings. A disadvantage with this technique is that it requires extra components. The extra components require extra space which is expensive.

As vibrators are finding use in more and more applications, such as a response to some user action, as part of a tactile feedback scheme, as part of a game, as a communication method (such as Morse code) or as a rhythmic element in music, this greater use leads to increased wearing of the vibrator.

SUMMARY OF THE INVENTION

In view of the above, an objective of the invention is to solve or at least reduce the problems discussed above and to provide a simple and effective method to tune an alert device.

The invention provides, according to a first aspect, a method of tuning an alert device in a portable communication apparatus having a microphone, the method comprising the steps of recording, through the microphone, an acoustic signal which is emitted by the alert device in response to a drive signal, deriving a characteristic value of the recorded signal, comparing the characteristic value with a reference value and generating a comparison result, and controlling the drive signal of the alert device in response to the comparison result.

The portable communication apparatus can for example be a mobile terminal, such as a mobile telephone, a personal digital assistant, or a laptop computer.

The microphone in the portable apparatus is advantageously the same one as the one used for recording for example speech.

An advantage by using the built-in microphone to tune the alert device is that, since no new specific components other than software are required, the implementation is quite easily done and inexpensive. The implementation does not affect the weight of the portable communication apparatus. Still an advantage is that the implementation can be done in already existing portable communication apparatus with a simple reprogramming or flashing.

Another advantage is that the standby time is increased since the method does not require much energy.

Another advantage is that cheaper vibrators can be used, since the variations in the vibrating frequency are no longer as critical and since wearing of the vibrators will be lessened.

The tuning can be done to any type of drive signal driving an alert device.

In one embodiment, the characteristic value is a frequency value. In another embodiment, the characteristic value is some higher harmonic or combination of harmonics of the vibration frequency.

The frequency value is a frequency of the acoustic signal emitted by the alert device.

In one embodiment, the characteristic value is derived by performing a spectral analysis of the recorded signal, and identifying a frequency peak from the spectral analysis, wherein the frequency peak determines the characteristic value.

In one embodiment the alert device is a vibrator.

An advantage by using this method to tune the vibrator is that power is saved by keeping the frequency low, and thus the standby time of the communication apparatus is increased.

In this embodiment the acoustic signal will be the vibration frequency of the vibrator.

In one embodiment the characteristic value is a volume value.

In another embodiment the alert device is a tone generator.

Tuning the volume of the tone generator can help prolong the longevity of the speaker in the mobile phone as unwanted high levels thus can be avoided.

The tone generator can for example be the buzzer, that is the device that produces the ring signal of the portable communication apparatus. Thus, in this embodiment the acoustic signal will be the ring signal.

In another embodiment, the alert device is a polyphonic sound generator.

The polyphonic sound generator can for example be a MIDI (musical instrument digital interface) system.

In one embodiment the drive signal is an electric signal and is controlled in voltage steps to cause corresponding shifts in frequency of the acoustic signal emitted by the alert device towards a desired reference value.

In one embodiment, the method further comprises the step of performing the steps repetitively to tune the acoustic signal.

The tuning can for example be performed at power-up. Advantageously, when the measurement is done repetitively, if some measurements happen to be bad, these bad readings can simply be discarded and the old settings may be used until the next reading. If these readings are done often enough this should not pose any problems, as a good measurement is only needed once every couple of months.

According to a second aspect, the invention also involves a portable communication apparatus having a microphone, an alert device and a controller, wherein the microphone is adapted to record an acoustic signal, which is emitted by the alert device in response to a drive signal, and the controller is adapted to derive a characteristic value of the recorded signal, to compare the characteristic value with a reference value, to generate a comparison result and to control the drive signal of the alert device in response to the comparison result.

The advantages of the portable communication apparatus are essentially the same as described above for the method.

BRIEF DESCRIPTION OF THE DRAWINGS

A few embodiments of the present invention will now be described in more detail, reference being made to the enclosed drawings, in which.

DETAILED DESCRIPTION OF EMBODIMENTS OF THE INVENTION

Figure 1:
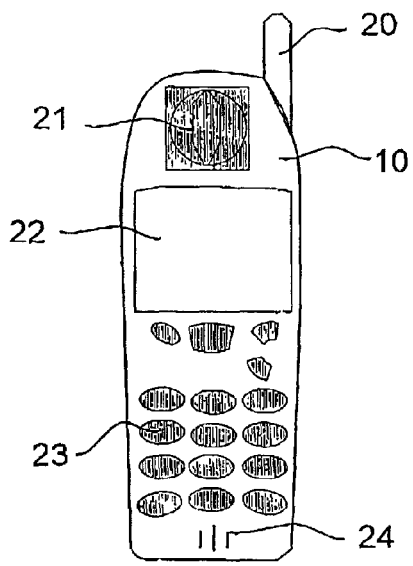
FIG. 1 is a schematic front view of a portable communication apparatus.

FIG. 1 shows a portable communication apparatus and more specifically a mobile telephone 10. The mobile telephone may be any commercially available device for a mobile telecommunications system such as GSM, UMTS, PDC, AMPS or D-AMPS.

As is well known in the technical field, the mobile telephone 10 comprises an antenna 20, a loudspeaker 21, a display 22, a plurality of keys 23, and a microphone 24.

Figure 2:
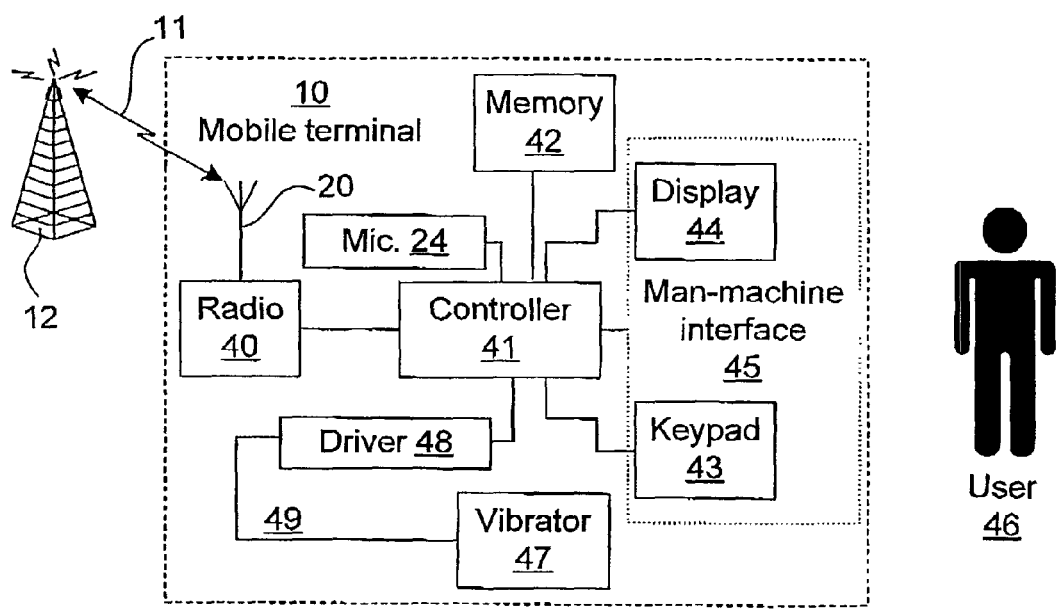
FIG. 2 is a schematic block diagram of some components of the portable communication apparatus shown in FIG. 1, in which a vibrator is tuned with in accordance with the present invention.

FIG. 2 illustrates some internal components, within the context of the present invention, of the mobile telephone 10. A controller 41 is responsible for the overall operation of the mobile telephone 10 and is preferably implemented by any commercially available CPU ("Central Processing Unit"), DSP ("Digital Signal Processor") or any other electronic programmable logic device. The controller 41 is coupled to a radio interface 20, 40, comprising the antenna 20 and radio circuitry 40. The radio interface 20, 40 is responsible for establishing and maintaining a wireless link 11 to the base transceiver station 12. As is well known in the art, the radio circuitry 40 comprises a series of analog and digital electronic components, which together form a radio receiver and transmitter. The radio circuitry 40 comprises, that is, band pass filters, amplifiers, mixers, local oscillators, low pass filters, AD converters, etc.

The controller 41 is also connected to an electronic memory 42, such as a RAM memory, a ROM memory, an EEPROM memory, a flash memory, or any combination thereof. The memory 42 is used for various purposes by the controller 41, one of them being for storing data and program instructions, which form a man-machine interface 45. The man-machine interface 45 also involves a keypad 43 (corresponding to the keys 23 in FIG. 1) and a display 44 (corresponding to the display 22 in FIG. 1). A user 46 of the mobile telephone 10 will operate the telephone through the man-machine interface 45, as is well known per se.

The controller 41 is further connected via a driver 48 to a vibrator 47, which vibrates with a frequency $f_a$, for example when the telephone receives a call or a SMS.

The vibrator 47 is driven by the driver 48 which provides the vibrator 47 with a drive signal containing a DC voltage or DC current component. This drive signal may be a square wave, a pulse train signal or it may be pure DC. The frequency $f_a$ of the vibrator 47 is dependent on the amplitude of the DC component. The higher the DC component amplitude, the higher the frequency. If a pulse train is used, the frequency of the pulse train is not what determines the characteristic value, that is the actual frequency $f_a$ of the vibrator. Instead the actual frequency $f_a$ is determined by the DC component of the pulse train, in relation to a reference level (usually GND or $V_{bat}$). This DC component will be proportional to the fraction of time that the pulse train is above (in case the reference is GND) or below (in case the reference is $V_{bat}$) the reference. The driver 48 is controlled by the controller 41.

Figure 7:
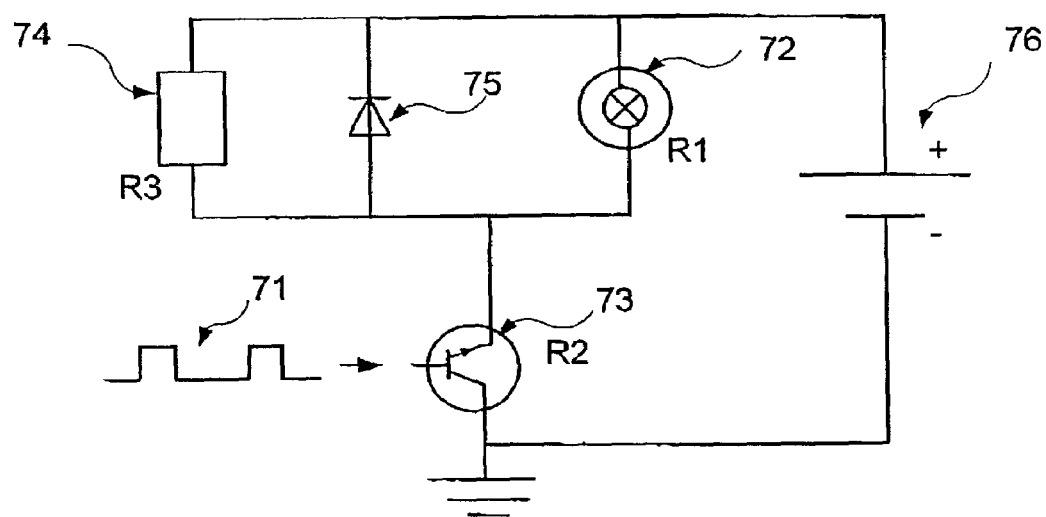
FIG. 7 is block diagram schematically showing a driver for an alert device.

FIG. 7 schematically illustrates one embodiment of the driver 48. A pulse train 71 having a frequency of 512 Hz and a duty cycle of 40–50% is sent to a transistor 73. This determines the impedance R2 over the input terminal and is 5 Ohms [3; 7.5 Ohms]. The impedance R1 of the vibrator 72 is 8 Ohms [7; 9 Ohms]. The two impedances R1 and R2 together with the voltage $V_{bat}$ from the battery 76 and the response of the vibrator 72 determines the operating frequency of the vibrator 72. The voltage $V_{bat}$ of the battery 76 is typically 4 V [3.2; 4.5 V]. The resistance R3 of the resistor 74 is very large, in the order of 10 kOhms, and the diode 75 in parallel with the resistor 74 acts to neutralize the electric force produced by the inductor effect of the motor.

The vibrator 47 is initially driven with a drive signal that will make an average vibrator motor vibrate at a certain desired frequency $f_{ref}$. This frequency $f_{ref}$ is a reference value and is stored in the memory 42. Due to variations in efficiency of the motor of the vibrator 47 and/or the response and the impedance in the output terminal of the driver 48, the actual frequency $f_a$ of the vibrator 47 is seldom the same as the desired frequency $f_{ref}$. To maintain the desired frequency $f_{ref}$, a tuning of the vibrator is done once or repetitively, for example at power up.

Figure 5:
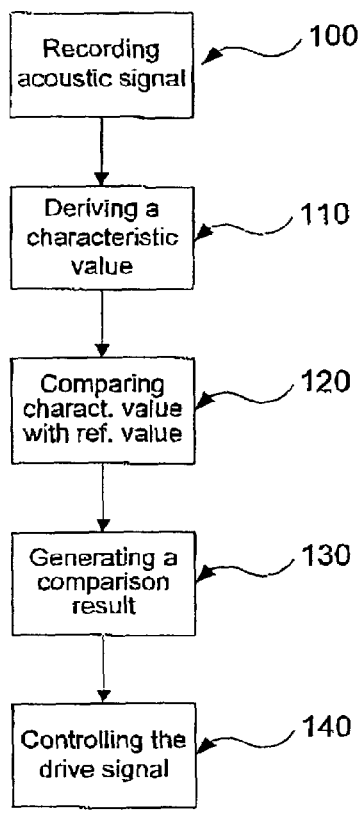
FIG. 5 is a schematic flowchart of a general method for tuning an alert device according to one embodiment of the invention.

In a first embodiment a general method according to the invention is described by way of reference to the schematic flow chart in FIG. 5.

The mobile telephone 10 is arranged to tune the vibrator 47 at power up. At power up the driver 48 generates a drive signal 49 to the vibrator 47 which, in response to the drive signal 49, vibrates with a certain frequency $f_a$. The vibration causes the vibrator 47 to emit an acoustic signal. The mobile telephone 10 will tune the vibrator 47 by the following steps.

The acoustic signal is recorded, in step 100, through the microphone 24. The controller 41 derives, in step 110, a characteristic value of the recorded signal. Further, the controller 41 compares, in step 120, the characteristic value with a desired reference value $f_{ref}$ and generates, in step 130, a comparison result. The controller 41 then controls, in step 140, the drive signal 49 of the vibrator 47 in response to the comparison result.

Figure 6:
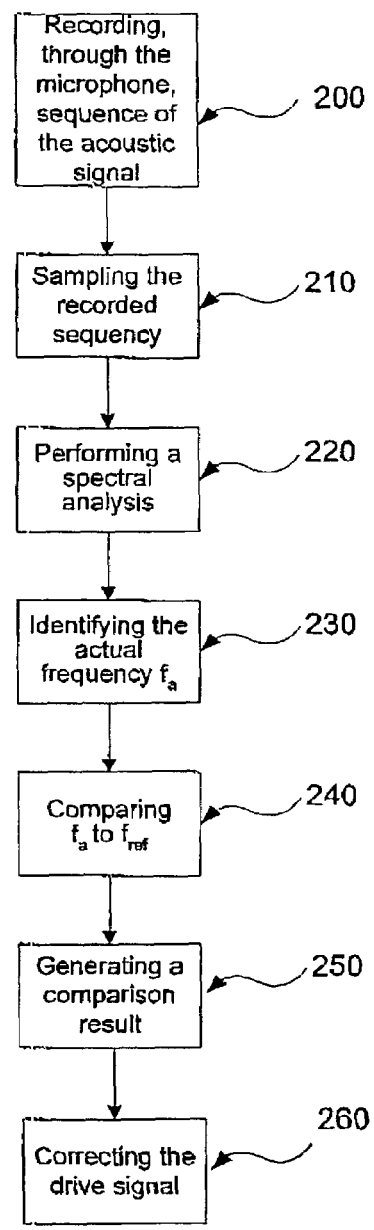
FIG. 6 is a schematic flowchart of a specific method for tuning an alert device according to one embodiment of the invention.

In the following the method for tuning the vibrator 47 according to one embodiment of the invention will be explained in more detail by way of reference to FIG. 6.

The mobile telephone 10 records, in step 200, through the microphone 24, a sequence of the acoustic signal. The controller 41 then samples, in step 210, the recorded sequence. The frequency of the vibrator is usually around 100 Hz and the sampling frequency $f_s$ can be set to 400 Hz. The controller 41 is adapted to perform a spectral analysis, in step 220, by generating a spectrogram of the recorded and sampled sequence by using the Fast Fourier Transformation (FFT). The controller 41 is adapted to identify, in step 230, the actual frequency $f_a$ from the spectrogram as a clearly discernible from a sole dominant peak in the spectrogram. The controller 41 compares, in step 240, the actual frequency $f_a$ to the desired frequency $f_{ref}$ and generates, in step 250, a comparison result as the difference between $f_a$ and $f_{ref}$. The controller 41 controls the driver 48 to correct, in step 260, the drive signal according to the comparison result.

The adjustment of the drive signal can be done in steps of a couple of percent, but can also be done almost infinite variably. For example it can be done in steps of 7.5%, which correspond to steps of approximately 100–200 mV, which in turn correspond to frequency steps of 20–30 Hz.

If a pulse drive signal is used, the drive frequency is not that important. It is more important that the pulse drive signal is above a certain threshold value depending on the design of the portable communication apparatus 10. The threshold value is usually around a couple of hundred Hertz, for example 512 Hz to 2.2 kHz for the drive frequency. It is the duty cycle of the wave, i.e. how much of the signal is below the battery voltage that decide the average DC level, deciding the actual vibrator frequency $f_a$.

If a pure DC current is used for driving the vibrator 47, the variations in the motor of the vibrator still affect the frequency of the vibrator, and the tuning still has a positive effect.

Heavy background noise with low frequency, such as cars, engines, the terminal lying on a desk or other flat surfaces, may corrupt the measurement so that no clear peak is discernible after the FFT. If the tuning is only to be done once or seldom, it is more important to do it accurately with the measuring being done under circumstances minimizing noise factors, for example in the shop when the telephone is sold. If the measurement is done repetitively, some measurements can be bad because these bad readings can simply be discarded and the old settings be used until the next reading. If these readings are done often enough this should not pose any problems as a good measurement is only needed once every couple of months.

Figure 3:
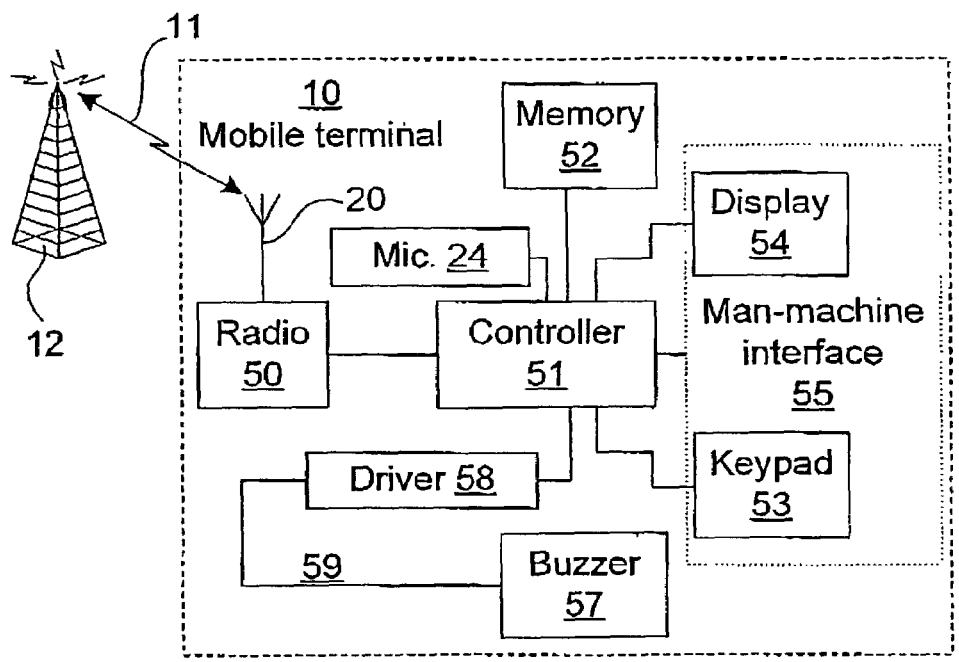
FIG. 3 is a schematic block diagram of some components of the portable communication apparatus shown in FIG. 1, in which a buzzer is tuned in accordance with the present invention.

FIG. 3 illustrates some internal components of an alternative embodiment of the mobile telephone 10. The internal components, which are a radio 50, a controller 51, a memory 52, a keypad 53, a display 54, man-machine interface 55 and a driver 58, are essentially the same as in FIG. 2. In this embodiment the controller 51 is adapted to tune a buzzer 57, that is the tone generator of the ring signal. The buzzer 57 is driven by the driver 58 which provides the buzzer 57 with a drive signal 59. The method of tuning the buzzer 57 is essentially the same as the above described method of tuning the vibrator 47 in FIG. 2 except that it is now the volume of the device that is being tuned.

Figure 4:
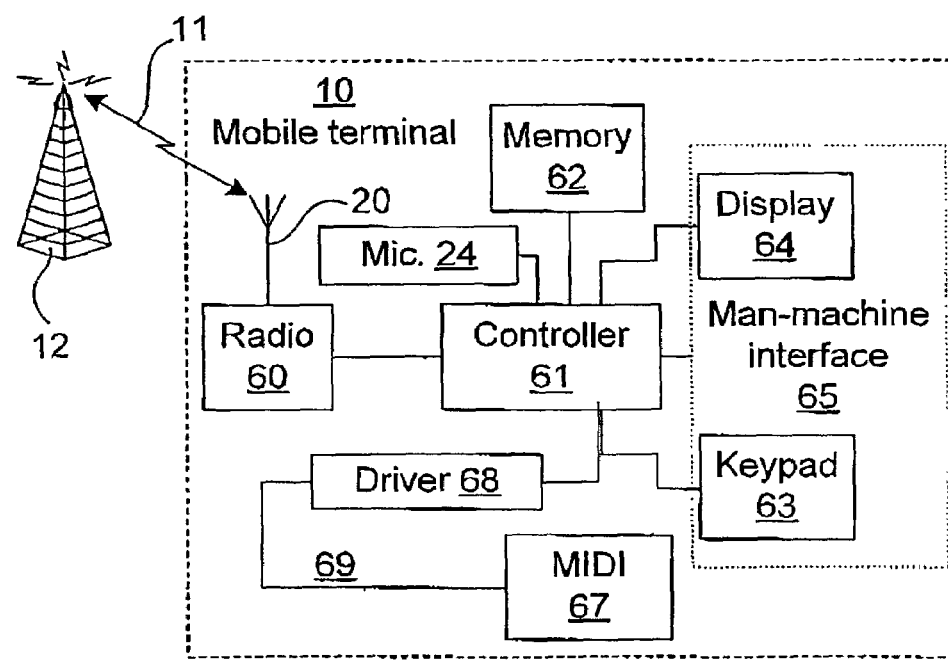
FIG. 4 is a schematic block diagram of some components of the portable communication apparatus shown in FIG. 1, in which a MIDI system is tuned in accordance with the present invention.

FIG. 4 illustrates some internal components of still another embodiment of the mobile telephone 10. The internal components, which are a radio 60, a controller 61, a memory 62, a keypad 63, a display 64, man-machine interface 65 and a driver 68, are essentially the same as in FIG. 2. In this embodiment the controller 61 is adapted to tune a MIDI (musical instrument digital interface) system 67, that is a polyphonic sound generator. The MIDI 67 is driven by the driver 68 which provides the MIDI 67 with a drive signal 69. The method of tuning the MIDI 67 is essentially the same as the above described method of tuning the vibrator 47 in FIG. 2 except that it is now the volume of the device that is being tuned.

While the present invention has been described in connection with various embodiments, many modifications will be readily apparent to those skilled in the art. For example, the portable communication apparatus 10 can also be a personal digital assistant, or a laptop computer with a UMTS interface.

What I claim and desire to secure by Letters Patent is:

1. A method of tuning an alert device in a portable communication apparatus including a microphone, comprising the steps of:

recording, through the microphone, an acoustic signal which is emitted by the alert device in response to a drive signal;

deriving a characteristic value of the recorded signal;

comparing the characteristic value with a reference value and generating a comparison result; and controlling the drive signal of the alert device in response to the comparison result.

2. A method according to claim 1, wherein the characteristic value is a frequency value.

3. A method according to claim 2, wherein the characteristic value is derived by the steps of:

performing a spectral analysis of the recorded signal; and identifying a frequency peak from the spectral analysis, wherein the frequency peak determines the characteristic value.

4. A method according to claim 1, wherein the alert device is a vibrator.

5. A method according to claim 1, wherein the characteristic value is a volume value.

6. A method according to claim 1, wherein the alert device is a tone generator.

7. A method according to claim 1, wherein the alert device is a polyphonic sound generator.

8. A method according to claim 1, wherein the drive signal is an electric signal and is controlled in voltage steps to cause corresponding shifts in frequency of the acoustic signal emitted by the alert device towards a desired reference value.

9. A method according to claim 1, further comprising the step of performing the said steps repetitively to tune the acoustic signal.

10. A portable communication apparatus having a microphone, an alert device and a controller, wherein:
   the microphone is adapted to record an acoustic signal; which is emitted by the alert device in response to a drive signal; and
   the controller is adapted to derive a characteristic value of the recorded signal, to compare the characteristic value with a reference value, to generate a comparison result and to control the drive signal of the alert device in response to the comparison result.

11. A portable communication apparatus according to claim 10, wherein the characteristic value is a frequency value.

12. A portable communication apparatus according to claim 11, wherein the controller is adapted to perform a spectral analysis of the recorded signal to derive the characteristic value; and to identify a frequency peak from the spectral analysis, wherein the frequency peak determines the characteristic value.

13. A portable communication apparatus according to claim 10, wherein the alert device is a vibrator.

14. A portable communication apparatus according to claim 10, wherein the characteristic value is a volume value.

15. A portable communication apparatus according to claim 10, wherein the alert device is a tone generator.

16. A portable communication apparatus according to claim 10, wherein the alert device is a polyphonic sound generator.

17. A portable communication apparatus according to claim 10, wherein the drive signal is an electric signal and the controller is adapted to control the drive signal towards a desired reference value in voltage steps to cause corresponding shifts in frequency of the acoustic signal emitted by the alert device.

18. A portable communication apparatus according to claim 10, which is adapted to perform repetitive tuning of the acoustic signal.

* * * * *